United States Patent [19]

Maeda et al.

[11] Patent Number: 5,686,925

[45] Date of Patent: Nov. 11, 1997

[54] SYSTEM FOR OBTAINING A VELOCITY OF A MOVING OBJECT FROM A SPEED SENSOR WITH AN IMPROVED ADJUSTMENT OF A SPEED CONVERSION COEFFICIENT

[75] Inventors: Hiroyuki Maeda, Yokohama; Takumi Ajima, Zama, both of Japan

[73] Assignee: Matsushita Electric Industrial Co., Ltd., Osaka, Japan

[21] Appl. No.: 495,966

[22] Filed: Jun. 28, 1995

[30] Foreign Application Priority Data

Jun. 30, 1994 [JP] Japan .................................. 6-150269

[51] Int. Cl.⁶ .................................................. G01S 5/02
[52] U.S. Cl. ........................... 342/357; 342/104; 342/461
[58] Field of Search ............................... 342/104, 357, 342/461; 364/449

[56] References Cited

U.S. PATENT DOCUMENTS

| | | | |
|---|---|---|---|
| 4,903,212 | 2/1990 | Yokouchi et al. | 364/445 |
| 4,928,106 | 5/1990 | Ashjaee et al. | |
| 5,122,961 | 6/1992 | Toyama et al. | 364/445 |
| 5,187,978 | 2/1993 | Tendler | |
| 5,220,509 | 6/1993 | Takemura et al. | 364/445 |
| 5,241,313 | 8/1993 | Shaw et al. | |
| 5,276,451 | 1/1994 | Odagawa | 342/357 |
| 5,315,295 | 5/1994 | Fujii | 340/536 |
| 5,396,253 | 3/1995 | Chia | 342/104 |
| 5,539,647 | 7/1996 | Shibata et al. | 364/454 |
| 5,546,311 | 8/1996 | Sekine | 364/449 |

FOREIGN PATENT DOCUMENTS

| | | |
|---|---|---|
| 0389972 | 10/1990 | European Pat. Off. . |
| 0527558 | 2/1993 | European Pat. Off. . |
| 4-121618 | 4/1992 | Japan . |
| 6-066916 | 3/1995 | Japan . |

Primary Examiner—Thomas H. Tarcza
Assistant Examiner—Dao L. Phan
Attorney, Agent, or Firm—Lowe, Price, LeBlanc & Becker

[57] ABSTRACT

A speed conversion coefficient calculating section 104 calculates a ratio of a GPS Doppler velocity calculated by a GPS velocity calculating section 101 to a vehicle speed measured by a speed sensor 102, thereby obtaining a speed conversion coefficient. There are provided a plurality of filtering sections 105–108 for averaging momently produced speed conversion coefficients. A filter selecting section 109 selects an optimum filtering section among these filtering sections 105–108. If a ratio of the speed conversion coefficient resultant from the speed conversion coefficient calculating section 104 to a presently adopted speed conversion coefficient is not within a predetermined range, an abnormality detecting & initializing section 110 notifies abnormality and initializes calculation process of the speed conversion coefficient in response to detection of such an abnormality.

13 Claims, 3 Drawing Sheets

SYSTEM FOR OBTAINING A VELOCITY OF A MOVING OBJECT FROM A SPEED SENSOR WITH AN IMPROVED ADJUSTMENT OF A SPEED CONVERSION COEFFICIENT

BACKGROUND OF THE INVENTION

1. Field of the Invention

This invention generally relates to vehicle position/speed calculating technologies incorporated in vehicle navigation systems which are usually capable of displaying position, direction, and other geographical information of each vehicle, and more particularly to a vehicle speed calculation system with an improved adjustment for converting a wheel rotational speed into a moving distance of a vehicle.

2. Prior Art

Conventionally available vehicle navigation systems are generally equipped with speed sensors (which are, for example, responsive to a predetermined travelling distance of each vehicle and generates a pulse signal detectable by a magnetic pickup device associated with a magnetic projection attached on a rotational shaft of a vehicle wheel) and angular sensors (which are, for example, optical fiber gyro-sensors, gas-rate gyro-sensors or the like capable of outputting a momentary angular displacement or an angular velocity of a vehicle, or geomagnetic sensors capable of detecting a change of absolute direction). These speed sensors and angular sensors are normally used to obtain a moving distance and an angular displacement of each vehicle, in order to identify the position and direction of each vehicle.

To increase accuracy of measurements, some of conventional vehicle navigation systems are coupled or combined with a GPS (Global Positioning System) which is a huge-scale positioning or navigation system designated to use numerous satellites, each carrying atomic clocks, to provide a receiver on earth with extremely accurate measurements of its three-dimensional position, velocity, and time.

However, there is a problem that the assistance by GPS is not satisfactory at present. More specifically, when vehicles are running in urban cities crowded by towering buildings or in high mountain areas, there is the possibility that the number of available satellites is greatly reduced or the receivers of the vehicles cannot virtually communicate with any satellites of the GPS. Furthermore, in the case of GPS measurements for non-military purposes, the settings of accuracy is generally not high.

In view of above, it is mandatorily required that accuracy of the speed sensor itself is always maintained at a satisfactory level. The speed sensors are expected to have a function of converting a pulse number representing a wheel rotational speed into a vehicle travelling distance, thus multiplying a specific conversion coefficient with the former to obtain the latter.

Such a specific conversion coefficient (i.e. speed sensor coefficient) has a nature of widely varying in accordance with the type of vehicle. Thus, it is generally required to independently check individual speed sensor coefficients and set their own initial values. Furthermore, when a wheel diameter is reduce due to aging of the wheel or leakage of compression air, or when a worn-out wheel is exchanged to a new one, there is arisen the necessity of newly checking or correcting the speed sensor coefficient to assure accurate measurements. All of such troublesome works rely on self-services by the users of the navigation systems; thus, it was conventionally very difficult to guarantee these speed sensor coefficients being accurately adjust.

Furthermore, according to the conventional technologies, the process of calculating the speed sensor coefficients requires us to make a judgement of whether or not a concerned vehicle goes straight. To realize it, it will be normally required to use highly-accurate relative azimuth sensors, such as optical fiber gyro-sensors, which possibly bring increase of cost of the whole system. It is of course possible to use cheaper (less accurate) relative azimuth sensors, such as vibration gyro-sensors; however, employment of such gyro-sensors must endure a long-lasting adjustment or correction of distance coefficients including correction (sensitivity, offset etc) of the gyro-sensors themselves, possibly being accompanied with large detection errors.

SUMMARY OF THE INVENTION

Accordingly, in view of above-described problems encountered in the prior art, a principal object of the present invention is to provide a system for promptly and accurately obtaining a speed sensor coefficient fitting to any type of vehicle irrespective of accuracy of the gyro-sensors.

In order to accomplish this and other related objects, a first aspect of the present invention provides a system for obtaining a velocity of a moving object, wherein a GPS travelling velocity of a moving object is calculated based on a Doppler shift observed by a Global Positioning System; a speed signal representing a travelling speed of the moving object is measured by a speed sensor; and a ratio of the travelling speed obtained from the speed sensor to the GPS travelling velocity is calculated, so as to obtain a speed conversion coefficient.

According to the present invention system, it is preferable to further make a judgement as to whether the GPS velocity is more than a predetermined threshold, so as to allow calculation of the speed conversion coefficient only when the GPS velocity is more than the predetermined threshold.

Furthermore, it is preferable that a predetermined filtering operation is performed for averaging the speed conversion coefficient resultant from the calculation of the speed conversion coefficient, for finally obtaining an updated speed conversion coefficient.

Yet further, it is preferable that an optimum filtering section is selectively chosen among a plurality of filtering sections arranged in parallel with each other and having different time constants. More specifically, a first filtering section having a small time constant is chosen when a resultant filtering output is not stabilized, and selects a second filtering section having a large time constant when the resultant filtering output is stabilized.

Moreover, it is preferable that an abnormality is detected by judging whether or not a ratio of the speed conversion coefficient resultant from the calculation of the speed conversion coefficient to a presently adopted speed conversion coefficient is within a predetermined range, and then the speed conversion coefficient calculating process is initialized in response to detection of abnormality.

In accordance with the above arrangement, the present invention effectively uses the GPS Doppler velocity for updating the speed conversion coefficient. An advantage of using the GPS Doppler velocity is to speedily obtain a speed conversion coefficient irrespective of accuracy of azimuth sensors.

Furthermore, in view of the fact that the error of the GPS Doppler velocity is enlarged with decreasing speed of a mobile object, the present invention allows renewal of the speed conversion coefficient only when the GPS velocity is more than a predetermined threshold, thereby effectively preventing erroneous calculation of the speed conversion coefficient.

Still further, performing a predetermined filtering operation for averaging momently obtained speed conversion coefficients is effective to stabilize the speed conversion coefficient.

Furthermore, the present invention provides a plurality of filtering sections having different time constants. With this arrangement, it becomes possible to selectively use an optimum filtering section in accordance with operating conditions. For example, the beginning stage for adjusting the speed conversion coefficient will require a filter having a quick follow-up ability (i.e. a small time constant), while a filter having a better stability (i.e. a large time constant) will be chosen when the adjustment is once stabilized. In other words, selecting an optimum filtering section among plural filtering sections will make it possible to simultaneously satisfy both the requirements from follow-up ability and accuracy.

Yet further, the present invention detects an abnormality by judging whether or not a ratio of the speed conversion coefficient resultant from the calculation of the speed conversion coefficient to a presently adopted speed conversion coefficient is within a predetermined range, and then initializes the speed conversion coefficient calculating process in response to detection of such an abnormality. With these functions, it becomes possible to quickly initialize the calculating process for obtaining the speed conversion coefficient and follow up any changes of vehicle wheels, speed sensors, vehicle model types or the like.

As apparent from the foregoing description, it will be readily understood that the speed conversion coefficient used to calculate an actual speed of a mobile object is quickly and accurately adjusted in response to any changes arisen on the navigation system without requiring manual adjustments by users.

BRIEF DESCRIPTION OF THE DRAWINGS

The above and other objects, features and advantages of the present invention will become more apparent from the following detailed description which is to be read in conjunction with the accompanying drawings, in which.

DETAILED DESCRIPTION OF THE PREFERRED EMBODIMENTS

Figure 1:
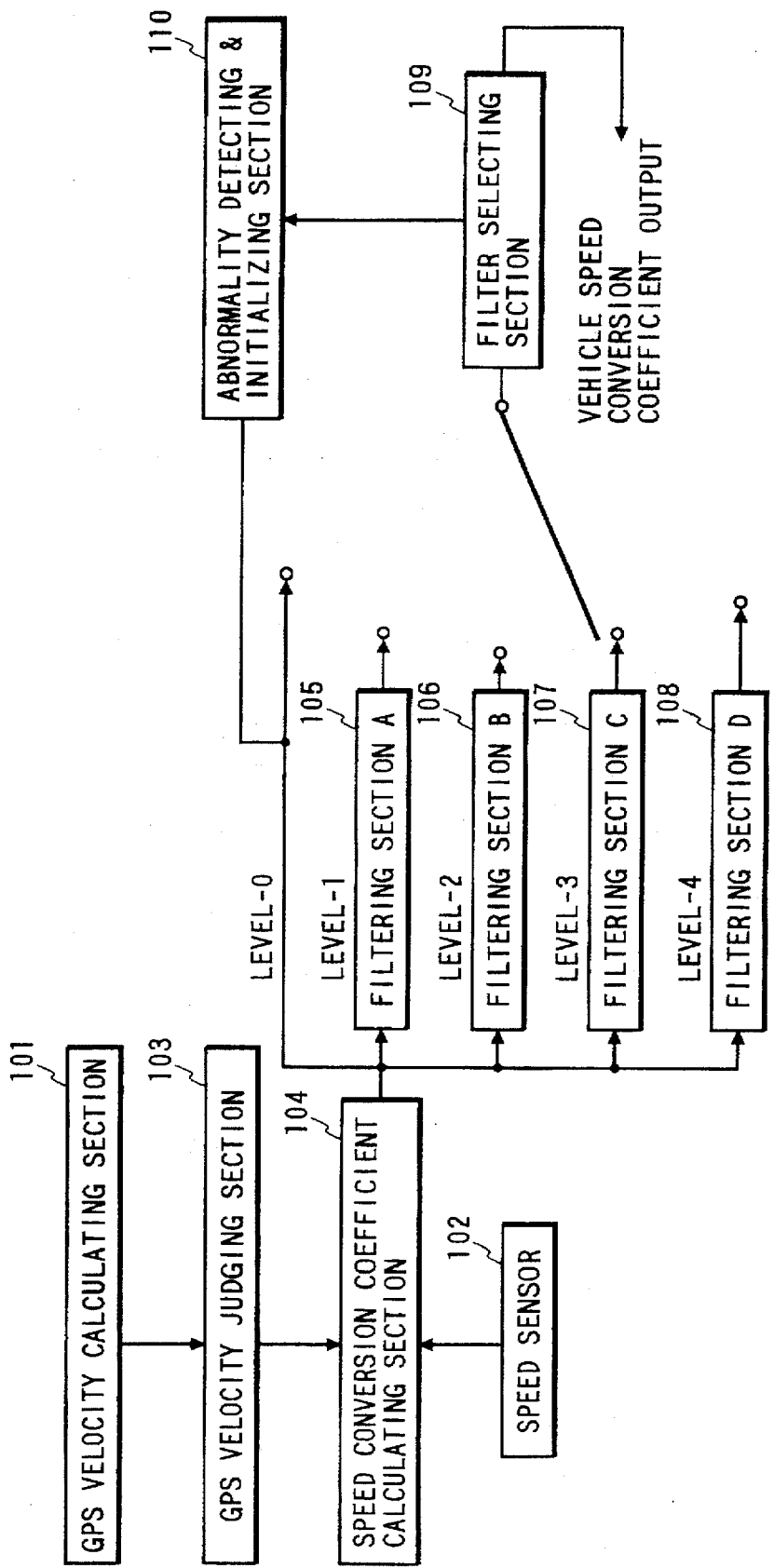
FIG. 1 is a schematic diagram showing a speed conversion coefficient calculating system in accordance with one embodiment of the present invention.

Preferred embodiments of the present invention will be explained in greater detail hereinafter, with reference to the accompanying drawings. Identical parts are denoted by an identical reference numeral throughout views.

FIG. 1 is a schematic view showing a speed conversion coefficient calculating system in accordance with one embodiment of the present invention. In FIG. 1, reference numeral 101 represents a GPS velocity calculating section, and reference numeral 102 represents a speed sensor which generates pulses in response to every increment of a predetermined travelling distance. Reference numeral 103 represents a GPS velocity judging section; reference numeral 104 represents a speed conversion coefficient calculating section; and reference numerals 105 through 108 represent a plurality of filtering sections arranged in parallel with each other and having different time constants a, b, c and d, where $a<b<c<d$, respectively. Each of these filtering sections has a function of smoothing a vehicle speed conversion coefficient obtained by the vehicle speed conversion coefficient calculating section 104. Reference numeral 109 represents a filter selecting section, and reference numeral 110 represents an abnormality detecting & initializing section.

Operation of the above-described embodiment of the present invention will be explained with reference to FIG. 1. First, the GPS velocity calculating section 101 obtains an effective GPS Doppler velocity based on a Doppler shift. The Doppler shift (=Doppler frequency) normally represents an amount of the change in the observed frequency of a wave due to Doppler effect, usually expressed in herz. The GPS velocity judging section 103 compares a vehicle speed with a predetermined threshold, to make a judgement whether or not the vehicle speed is sufficiently high in order to assure accuracy in obtaining a speed conversion coefficient. If the vehicle speed exceeds the predetermined threshold, the GPS velocity judging section 103 recognizes the GPS Doppler velocity as an acceptable GPS velocity, and sends it to the speed conversion coefficient calculating section 104.

The speed conversion coefficient calculating section 104 receives pulses from the speed sensor 102 as a speed signal representing a vehicle speed, the total number of these pulses corresponding to a duration for calculating the GPS velocity. More specifically, the speed conversion coefficient F [m/pulse] is defined by the following equation (1).

$$F=Vg/Vp \qquad (1)$$

where Vg [m/sec] is a GPS velocity, and VD [pulse/sec] is a total number of pulses obtained from the speed sensor 102 per second.

The filtering sections 105 through 108, having mutually different time constants a, b, c and d, receive the speed conversion coefficient F calculated by the speed conversion coefficient calculating section 104 and modify the same through predetermined smoothing procedures defined by the following equations, respectively.

$$Fa(new)=\alpha a \cdot F+(1-\alpha a) \cdot Fa(old) \qquad (2)$$

$$Fb(new)=\alpha b \cdot F+(1-\alpha b) \cdot Fb(old) \qquad (3)$$

$$Fc(new)=\alpha c \cdot F+(1-\alpha c) \cdot Fc(old) \qquad (4)$$

$$Fd(new)=\alpha d \cdot F+(1-\alpha d) \cdot Fd(old) \qquad (5)$$

where Fi(old) represents a previously obtained speed conversion coefficient, Fi(new) represent a renewed speed conversion coefficient to be obtained in the present smoothing cycle or interval, and $\alpha i$ represents a smoothing factor, where i=a, b, c, d.

To give different time constants to respective filtering sections 105 through 108, the values of smoothing factors $\alpha a$–$\alpha d$ are differentiated from each other, although the following condition is always satisfied.

$$0<\alpha i<1 (i=a, b, c, d) \qquad (6)$$

Each of these filtering sections 105 through 108 has an effective data number (determined based on time constants a, b, c, d) at which the smoothed speed conversion coefficient is validated (substantially converged at an appropriate value). When the data number reaches the effective data number, a corresponding filter effective FLAG is changed from 0 to 1.

The filer selecting section 109 has a function of retrieving each filter effective FLAG of these filtering sections 105 through 108 in the priority order of largeness of time constant (i.e. d→c→b→a) in view of accuracy of resultant filtering output. As soon as an effective filtering FLAG is found, the retrieval operation by the filter selecting section 109 is stopped. The coefficient of the validated filtering section found according to the effective filtering FLAG is recognized as a temporary optimum speed conversion coefficient in the present cycle of the smoothing operation. If all the filter effective FLAGs of the filtering sections 105 through 108 remain at 0, the filter selecting section 109 chooses the output of the speed conversion coefficient calculating section 104 so as to directly output the speed conversion coefficient obtained by the speed conversion coefficient calculating section 104 as the temporary optimum speed conversion coefficient.

In general, the effective data number of each filter is proportional to a time constant of the filter. Thus, the effective FLAGs of respective filtering sections are successively changed from 0 to 1 in the order of largeness of time constant of the filtering section 105 through the filtering section 108. In other words, if the situation is a very beginning of a transitional or unstable condition, the filter section 105 is first selected as the optimum filtering section because of its smallest effective data number. However, as time passes, the filtering sections 106–108 having larger time constants are successively validated. Namely, there comes a moment that a plurality of filtering sections are validated at the same time. In such a case, in view of accuracy of resultant filtering outputs, a filtering section having the most longest time constant is selected as an optimum filtering section. Thus, the filter selecting section 109 switches its connection from the filtering section 105 to the filtering section 106, to the filtering section 107, and finally to the filtering section 108, one after another in coincidence with each validation of the higher-level filtering section.

The abnormality detecting & initializing section 110 compares the speed conversion coefficient calculated by the speed conversion coefficient calculating section 104 with the smoothed speed conversion coefficient selected by the filter selecting section 109. If the ratio of compared speed conversion coefficients is not within a predetermined range (e.g. 90% to 110%) for a predetermined duration (e.g. a time corresponding to a given number of sampling intervals), it is considered that any sensor malfunctions or vehicle type or sensor is changed. Then, each data number of the filtering sections 105 through 108 is initialized to 0 and the filtering FLAGs are reset to 0.

The arrangement of FIG. 1 can be realized by appropriate hardware corresponding to respective sections shown in the drawing; however, it should be noted that the purpose of FIG. 1 is not to limit the practical structure of the system components. In this respect, FIG. 1 diagram illustrates the functions of the present invention. It is a common practice in the art to use such a functional diagram to explain signal processing or the like. An artisan having ordinary skill in the art may embody the present invention based on a system controlled by a micro computer.

Figure 2:
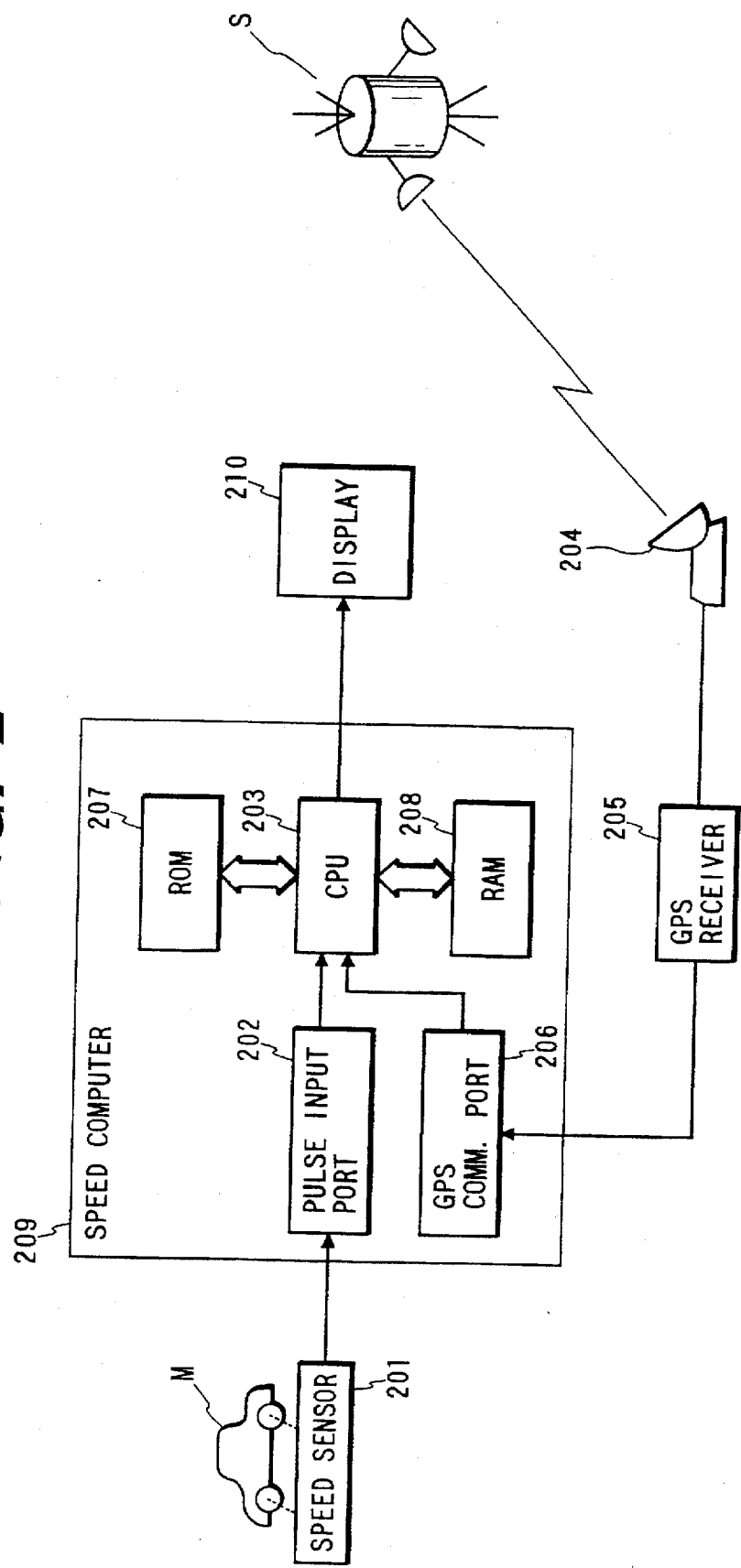
FIG. 2 is a schematic diagram showing one practical arrangement of the speed conversion coefficient calculating system using a micro computer, in accordance with the present invention.

FIG. 2 is a schematic diagram showing the arrangement of the speed conversion coefficient calculating system using a micro computer.

The speed sensor 201, provided in an automotive vehicle M, generates pulse signals representative of a vehicle speed. The output signal of the speed sensor 201 is entered into a CPU 203 through a pulse input port 202. Meanwhile, a GPS velocity, transmitted from a satellite S, is received by an antenna 204 and entered into the CPU 203 through a GPS receiver 205 and a GPS communication port 206. The CPU 203 is associated with a ROM 207 and a RAM 208 for performing various computing functions. The pulse input port 202, CPU 203, GPS communication port 206, ROM 207 and RAM 208 cooperatively constitute a vehicle speed computing apparatus 209. An output of the vehicle speed computing apparatus 209 is sent to a display unit 210 for indicating computed data.

Figure 3:
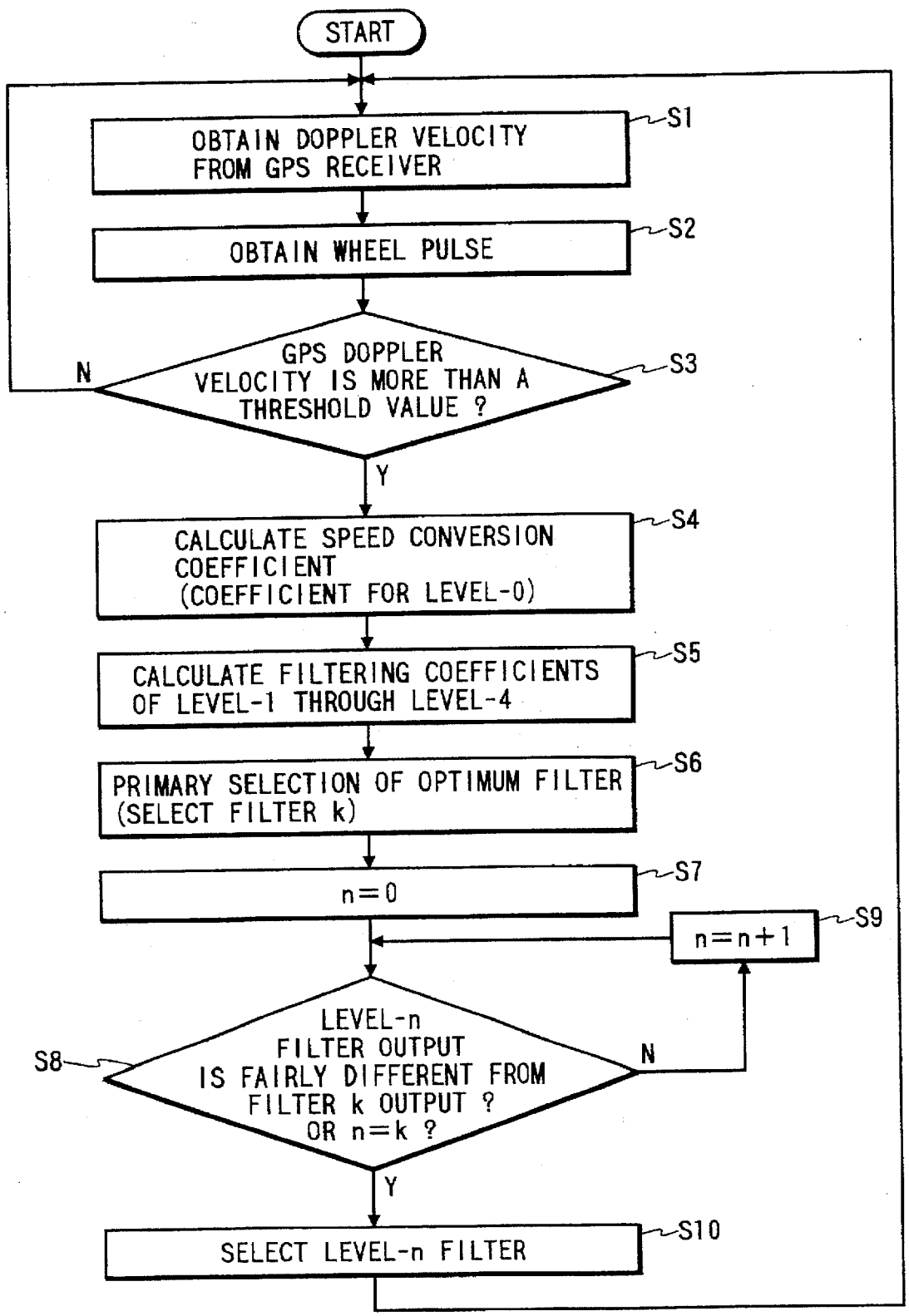
FIG. 3 is a flow chart showing operation of the speed conversion coefficient calculating system shown in FIG. 2.

Operation of the FIG. 2 speed computing system will be explained below, with reference to the flow chart of FIG. 3.

First, in a step S1, the GPS Doppler velocity is obtained through the GPS receiving section (GPS antenna 204, GPS receiver 205, GPS communication port 206). Meanwhile, in a step S2, a vehicle speed is measured through the speed sensor 201. Then, it is made a judgement in a step S3 as to whether the GPS Doppler velocity is more than a predetermined threshold, in order to confirm that the vehicle speed is sufficiently high to assure accuracy in obtaining a speed conversion coefficient.

If the vehicle speed exceeds the predetermined threshold ("YES" in the step S3), the detected GPS Doppler velocity is recognized as an acceptable GPS velocity. If the vehicle speed does not exceed the predetermined threshold ("NO" in the step S3), the steps S1 through S3 are repetitively executed until the required condition is cleared in the step S3.

Subsequently, in a step S4, a speed conversion coefficient is calculated based on the above-described equation (1) using the GPS velocity and the vehicle speed obtained in the above steps S1 through S3. The speed conversion coefficient obtained in the step S4 is referred to as a level-0 coefficient.

Next, in a step S5, a total of four kinds of filter coefficients (level-1 through level-4 defined by equations (2) through (5)) is obtained based on the speed conversion coefficient (level-0) obtained in the step S4. As described above, thus obtained four kinds of filters have mutually different time constants a, b, c and d (where, a<b<c<d).

Thereafter, in a step S6, an optimum filter k is selected based on a count value counted in the CPU 203 in response to each entry of a resultant speed conversion coefficient calculated in the step S3. More specifically, each filter has its own effective count value for convergence at which its filtering output substantially converges at an appropriate value. Accordingly, when the counter value reaches the predetermined effective count value of each filter, it is considered that the convergence of the corresponding filter is substantially completed. The effective count value is generally proportional to the time constant of the filter. In this embodiment, the effective count value is designed to be equivalent to three times of the time constant of each filter.

Shown below are the practical data for the design of the above four, level-1 through level-4, filters.

| Required Accuracy (Stability of Output) after Convergence | |
|---|---|
| Level-1 Filter | 5% |
| Level-2 Filter | 2% |
| Level-3 Filter | 1% |
| Level-4 Filter | 0.5% |

| Time Constant for each Filter | |
| --- | --- |
| Level-1 Filter | 4 |
| Level-2 Filter | 20 |
| Level-3 Filter | 110 |
| Level-4 Filter | 680 |

| Effective Count Value for Convergence | |
| --- | --- |
| Level-1 Filter | 12 |
| Level-2 Filter | 60 |
| Level-3 Filter | 330 |
| Level-4 Filter | 2040 |

According to the above data, the level-1 filter is first validated because of its effective count value smallest among four. In other words, the filters are validated successively in accordance with increment of the count value in the definite order of Level-1, Level-2, Level-3 and Level-4.

Hence, selection of the optimum filter k in the step 7 is performed in the following manner.

First, the filters which are already validated are chosen as candidates for the optimum filter k. Second, if there are a plurality of candidates in the above choice, then the optimum filter k is selected in view of accuracy of the filter. Accuracy of the filter generally increases with increasing time constant of the filter. Thus, if there are plural candidates for the optimum filter k, a filter having the largest time constant is finally selected as an optimum filter.

In short, the optimum filter k is successively replaced in synchronism with validation of filters, in the order of Level-1, Level-2, Level-3 and Level-4. Thus, it becomes possible to select a filter having a quick follow-up ability (i.e. a small time constant) in the beginning stage of adjusting the speed conversion coefficient, while selecting another filter having a better stability (i.e. a large time constant) when the adjustment is once stabilized. In other words, the selection of an optimum filter k among plural filters in accordance with the present invention makes it possible to simultaneously satisfy the requirements from both follow-up ability and accuracy.

Next, after the optimum filter k is once selected, a reference letter "n" representing the level of filter is reset to 1 in a step S7. Subsequently, it is checked in a step S8 as to whether or not the output of the designated level-n filter is fairly different from an output of the selected optimum filter k, or the level-n filter is identical with the optimum filter k. If the "NO" judgement is made in the step S8, the reference letter "n" is incremented by adding 1 as shown in a step S9 and the step S8 is executed repeatedly. If the "YES" judgement is made in the step S8, the level-n filter is determined as a finally selected optimum filter, as shown in FIG. 10.

The purpose of providing the above steps S7–S10 is to find abnormality. Therefore, execution of these steps S7–S10 will not change the result of the step S6 when no abnormal condition is detected. That is, the finally selected optimum filter in the step S10 is always identical with the primarily selected optimum filter in the step S6 as long as the operating condition is normal. However, these steps S7–S10 reject the result of step S7 in the event of any abnormality being once found.

For example, the navigation system may be reloaded from a certain vehicle to another vehicle of a different type with a certain possibility that the speed conversion coefficient is widely changed. In such a case, a filter having a large time constant cannot follow up the change occurred on the navigation system immediately, while a filter having a small time constant can follow up quickly. Thus, there is caused a significant difference between the outputs of these two filters in such an abnormal or transitional condition. The process of step S8 finds such a phenomenon by comparing the output of the lower-level filter with an output of the primarily selected optimum filter k. If the difference between the outputs of the lower-level filter and the primarily selected optimum filter k is larger than a predetermined threshold, the primary designation of the optimum filter k is completely denied and the lower-level filter is newly designated as an optimum filter as shown in the step 10. Furthermore, the calculation process for obtaining the speed conversion coefficient is initialized in response to detection of such an abnormality.

As apparent from the above embodiments, even if the speed conversion coefficient of a speed sensor is largely different from a speed conversion coefficient registered in a navigation system incorporated in an automotive vehicle, the speed conversion coefficient of the navigation system can be automatically updated so as to coincide with an actual speed conversion coefficient of the speed sensor within a short time.

Furthermore, performing the calculation of the speed conversion coefficient only when the GPS velocity is more than a predetermined threshold is effective to assure high accuracy of the measurements and to stabilize data values for filtering or smoothing operations.

Still further, provision of a plurality of filtering means having different time constants for allowing an appropriate one to be chosen among them is advantageous in guaranteeing both an excellent follow-up ability and an accuracy.

Moreover, detecting abnormality of the speed sensor makes it possible to ignore abnormal data, and the initialization function responding to the detection of such an abnormality is effective to automatically adjust the system in accordance with the change of vehicle model or the like.

As this invention may be embodied in several forms without departing from the spirit of essential characteristics thereof, the present embodiments as described are therefore intended to be only illustrative and not restrictive, since the scope of the invention is defined by the appended claims rather than by the description preceding them, and all changes that fall within metes and bounds of the claims, or equivalents of such metes and bounds, are therefore intended to be embraced by the claims.

What is claimed is:

1. An apparatus for obtaining a velocity of a moving object comprising:

GPS velocity calculating means for calculating a GPS traveling velocity of a moving object based on a Doppler shift observed by a global positioning system;

a speed sensor, provided in said moving object, for measuring a traveling speed of the moving object and generating a speed signal representing said traveling speed;

speed conversion coefficient calculating means for calculating a ratio of said traveling speed measured by said speed sensor to said GPS traveling velocity obtained from said GPS velocity calculating means, thereby obtaining a speed conversion coefficient;

judging means for making a judgement as to whether said GPS velocity is more than a predetermined threshold to allow said speed conversion coefficient calculating means to calculate the speed conversion coefficient only when the GPS velocity is more than said predetermined threshold;

filtering means for performing a predetermined filtering operation for averaging said speed conversion coefficient resultant from said speed conversion coefficient calculating means and finally obtaining an updated speed conversion coefficient;

said filtering means comprising a plurality of filtering sections arranged in parallel with each other and having different time constants, and outputs of said plurality of filtering sections being selectively chosen by filter selecting means so as to select an optimum filtering section; and abnormality detecting and initializing means for detecting an abnormality by judging whether or not a ratio of the speed conversion coefficient resultant from said speed conversion coefficient calculating means to a presently adopted speed conversion coefficient is within a predetermined range, and for initializing calculation process of said speed conversion coefficient calculating means in response to detection of abnormality.

2. An apparatus for obtaining a velocity of a moving object comprising:

GPS velocity calculating means for calculating a GPS traveling velocity of a moving object based on a Doppler shift observed by a global positioning system;

a speed sensor, provided in said moving object, for measuring a traveling speed of the moving object and generating a speed signal representing said traveling speed;

speed conversion coefficient calculating means for calculating a ratio of said traveling speed measured by said speed sensor to said GPS traveling velocity obtained from said GPS velocity calculating means, thereby obtaining a speed conversion coefficient;

judging means for making a judgement as to whether said GPS velocity is more than a predetermined threshold to allow said speed conversion coefficient calculating means to calculate the speed conversion coefficient only when the GPS velocity is more than said predetermined threshold;

filtering means for performing a predetermined filtering operation for averaging said speed conversion coefficient resultant from said speed conversion coefficient calculating means and finally obtaining an updated speed conversion coefficient; and abnormality detecting and initializing means for detecting an abnormality by judging whether or not a ratio of the speed conversion coefficient resultant from said speed conversion coefficient calculating means to a presently adopted speed conversion coefficient is within a predetermined range, and for initializing calculation process of said speed conversion coefficient calculating means in response to detection of abnormality.

3. An apparatus for obtaining a velocity of a moving object comprising:

GPS velocity calculating means for calculating a GPS traveling velocity of a moving object based on a Doppler shift observed by a global positioning system;

a speed sensor, provided in said moving object, for measuring a traveling speed of the moving object and generating a speed signal representing said traveling speed;

speed conversion coefficient calculating means for calculating a ratio of said traveling speed measured by said speed sensor to said GPS traveling velocity obtained from said GPS velocity calculating means, thereby obtaining a speed conversion coefficient; and filtering means for performing a predetermined filtering operation for averaging said speed conversion coefficient resultant from said speed conversion coefficient calculating means and finally obtaining an updated speed conversion coefficient.

4. The apparatus defined by claim 3, wherein said filtering means comprises a plurality of filtering sections arranged in parallel with each other and having different time constants, outputs of these plural filtering sections being selectively chosen by filter selecting means so as to select an optimum filtering section.

5. The apparatus defined by claim 4, wherein said filter selecting means selects a first filtering section having a small time constant when an output of said filtering means is not stabilized, and selects a second filtering section having a large time constant when the output of said filtering means is stabilized.

6. An apparatus for obtaining a velocity of a moving object comprising:

GPS velocity calculating means for calculating a GPS traveling velocity of a moving object based on a Doppler shift observed by a global positioning system;

a speed sensor, provided in said moving object, for measuring a traveling speed of the moving object and generating a speed signal representing said traveling speed;

speed conversion coefficient calculating means for calculating a ratio of said traveling speed measured by said speed sensor to said GPS traveling velocity obtained from said GPS velocity calculating means, thereby obtaining a speed conversion coefficient;

filtering means for performing a predetermined filtering operation for averaging said speed conversion coefficient resultant from said speed conversion coefficient calculating means and finally obtaining an updated speed conversion coefficient, said filtering means comprising a plurality of filtering sections arranged in parallel with each other and having different time constants, outputs of said plurality of filtering sections being selectively chosen by filter selecting means so as to select an optimum filtering section; and abnormality detecting and initializing means for detecting an abnormality by judging whether or not a ratio of the speed conversion coefficient resultant from said speed conversion coefficient calculating means to a presently adopted speed conversion coefficient is within a predetermined range, and for initializing calculation process of said speed conversion coefficient calculating means in response to detection of abnormality.

7. An apparatus for obtaining a velocity of a moving object comprising:

GPS velocity calculating means for calculating a GPS traveling velocity of a moving object based on a Doppler shift observed by a global positioning system;

a speed sensor, provided in said moving object, for measuring a traveling speed of the moving object and generating a speed signal representing said traveling speed;

speed conversion coefficient calculating means for calculating a ratio of said traveling speed measured by said speed sensor to said GPS traveling velocity obtained from said GPS velocity calculating means, thereby obtaining a speed conversion coefficient;

filtering means for performing a predetermined filtering operation for averaging said speed conversion coefficient result from said speed conversion coefficient calculating means and finally obtaining an updated speed conversion coefficient, and abnormality detecting and initializing means for detecting an abnormality by judging whether or not a ratio of the speed conversion coefficient resultant from said speed conversion coefficient calculating means to a presently adopted speed conversion coefficient is within a predetermined range, and for initializing calculation process of said speed conversion coefficient calculating means in response to detection of abnormality.

8. A method for obtaining a velocity of a moving object comprising steps of:

calculating a GPS traveling velocity of a moving object based on a Doppler shift observed by a global positioning system;

measuring a traveling speed of the moving object and generating a speed signal representing said measured traveling speed;

calculating a ratio of the measured traveling speed to said GPS traveling velocity, thereby obtaining a speed conversion coefficient; and performing a predetermined filtering operation for averaging said speed conversion coefficient resultant from said speed conversion coefficient calculating step and finally obtaining an updated speed conversion coefficient.

9. The method defined by claim 8, wherein said filtering step selectively chooses an optimum filtering section among a plurality of filtering sections arranged in parallel with each other and having different time constants.

10. The method defined by claim 9, wherein said filtering step chooses a first filtering section having a small time constant when a resultant filtering output is not stabilized, and selects a second filtering section having a large time constant when the resultant filtering output is stabilized.

11. A method for obtaining a velocity of a moving object comprising steps of:

calculating a GPS traveling velocity of a moving object based on a Doppler shift observed by a global positioning system;

generating a speed signal representing a traveling speed of said moving object measured by a speed sensor;

calculating a ratio of said traveling speed measured by said speed sensor to said GPS traveling velocity, thereby obtaining a speed conversion coefficient;

performing a predetermined filtering operation for averaging said speed conversion coefficient resultant from said speed conversion coefficient calculating step and finally obtaining an updated speed conversion coefficient;

detecting an abnormality by judging whether or not a ratio of the speed conversion coefficient resultant from said speed conversion coefficient calculating step to a presently adopted speed conversion coefficient is within a predetermined range, and initializing calculation process of said speed conversion coefficient calculating step in response to detection of abnormality.

12. An apparatus for obtaining a velocity of a moving object comprising:

GPS velocity calculating means for calculating a GPS traveling velocity of a moving object based on a Doppler shift observed by a global positioning system;

a speed sensor, provided in said moving object, for measuring a traveling speed of the moving object and generating a speed signal representing said traveling speed;

speed conversion coefficient calculating means for calculating a ratio of said traveling speed measured by said speed sensor to said GPS traveling velocity obtained from said GPS velocity calculating means, thereby obtaining a speed conversion coefficient; and abnormality detecting and initializing means for detecting an abnormality by judging whether or not a ratio of the speed conversion coefficient resultant from said speed conversion coefficient calculating means to a presently adopted speed conversion coefficient is within a predetermined range, and for initializing calculation process of said speed conversion coefficient calculating means in response to detection of abnormality.

13. A method for obtaining a velocity of a moving object comprising steps of:

calculating a GPS traveling velocity of a moving object based on a Doppler shift observed by a global positioning system;

measuring a traveling speed of said moving object and generating a speed signal representing said measured traveling speed;

calculating a ratio of said measured traveling speed to said GPS traveling velocity, thereby obtaining a speed conversion coefficient;

detecting an abnormality by judging whether or not a ratio of the speed conversion coefficient resultant from said speed conversion coefficient calculating step to a presently adopted speed conversion coefficient is within a predetermined range, and initializing calculation process of said speed conversion coefficient calculating step in response to detection of abnormality.

* * * * *